E. G. McDILL.
AUTOMOBILE TIRE.
APPLICATION FILED DEC. 18, 1912.
1,091,005.
Patented Mar. 24, 1914.
2 SHEETS—SHEET 1.
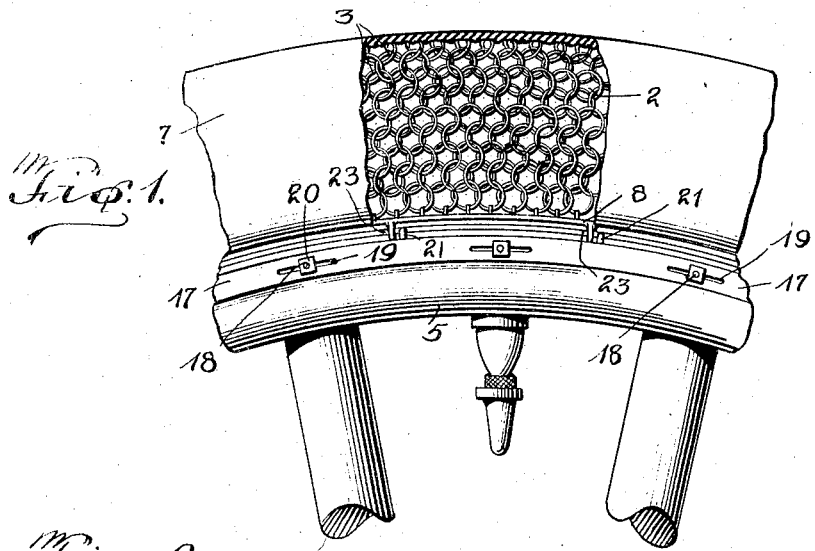
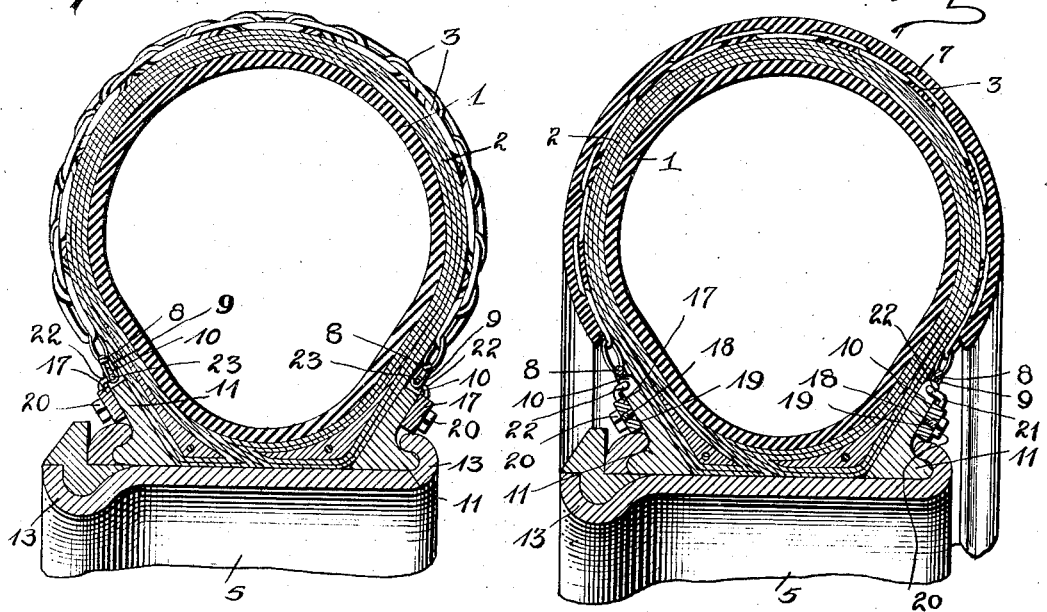
Witnesses
Ernest Crocker
Dudley B. Howard
Inventor
E. G. McDill
By Victor J. Evans
Attorney E. G. McDILL.
AUTOMOBILE TIRE.
APPLICATION FILED DEC. 18, 1912.
1,091,005.
Patented Mar. 24, 1914.
2 SHEETS—SHEET 2.
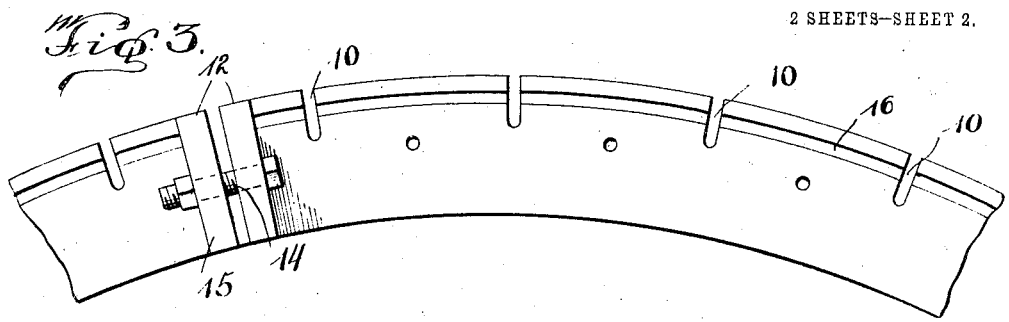
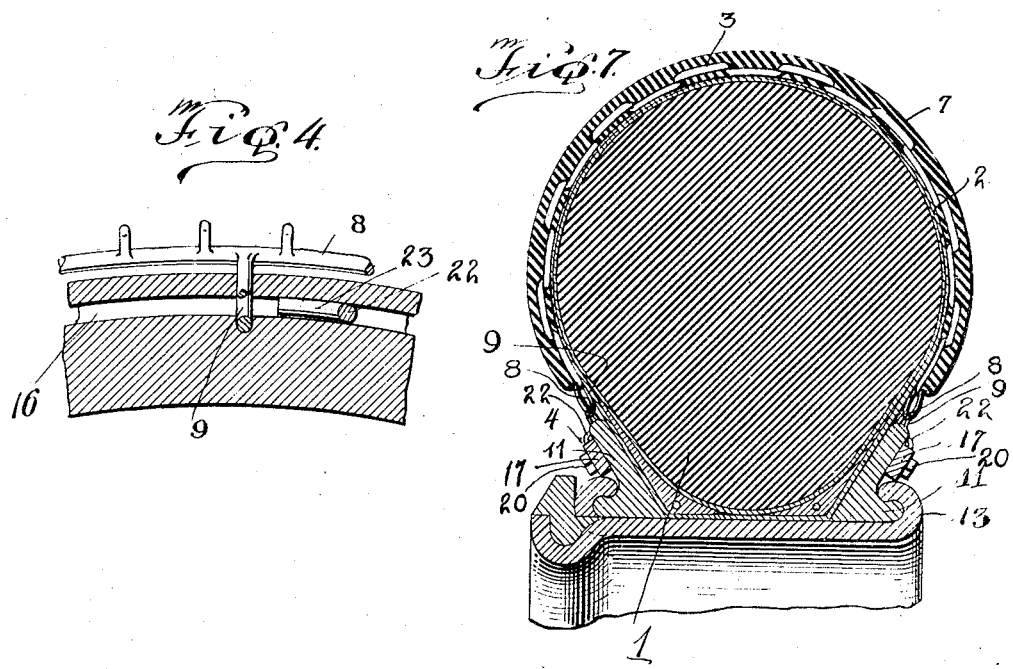
Witnesses
Ernest Crocker
Dudley B. Howard
Inventor
E. G. McDill
By Victor J. Evans
Attorney

UNITED STATES PATENT OFFICE.

ELIHU G. McDILL, OF SPARTA, ILLINOIS.

AUTOMOBILE-TIRE.

1,091,005.  Specification of Letters Patent.  Patented Mar. 24, 1914.

Application filed December 18, 1912. Serial No. 737,461.

*To all whom it may concern:*

Be it known that I, ELIHU G. MCDILL, a citizen of the United States, residing at Sparta, in the county of Randolph and State of Illinois, have invented new and useful Improvements in Automobile-Tires, of which the following is a specification.

This invention relates to vehicle tires, and particularly to tires designed for use upon the wheels of automobiles, an object being to provide a tire of this character which may be readily applied to or removed from the rim.

A further object of the invention is to provide a tire including an elastic inner tube, and an outer casing, or shoe including a tread portion constructed substantially of some tough metal and attaching portions adapted to be secured to the rim of the wheel and which are detachably secured to the said shoe, in order that the tread portion of the shoe may be replaced by a new tread portion when it has become worn, thus permitting the indefinite use of the attaching portions, as they are subjected to very little wear.

Another object is to provide a tire of this character wherein the tread portion of the shoe is composed of a metallic mesh, which will be very durable, will prevent puncture of the inner tube and will engage the pavement or ground firmly so as to prevent skidding of the machine when passing over slippery surfaces.

The invention consists in the features of construction, combination and arrangement of parts, hereinafter fully described and claimed, reference being had to the accompanying drawings, in which:

Figure 1 is a fragmentary side elevation of a wheel having a tire constructed in accordance with the preferred form of the invention attached thereto, the said tire being broken away to show the metallic tread portion of the shoe; Fig. 2 is a transverse sectional view on the line 2—2 of Fig. 1, showing an inflated inner tube employed therewith; Fig. 3 is a fragmentary side elevation of one of the attaching members; Fig. 4 is a longitudinal sectional view through a portion of one of the attaching members showing the manner of connecting the tread portion of the shoe thereto; Fig. 5 is a fragmentary perspective view of one of the movable locking elements carried by each attaching member; Fig. 6 is a detail transverse sectional view through a wheel rim, and a tire attached thereto having a modified form of shoe tread; and, Fig. 7 is a similar view showing the preferred form of shoe tread, a modified form of inner tube being shown as employed therewith.

Referring to the drawings, and in particular to Figs. 1 to 5 inclusive, it will be seen that I have provided a tire which includes, essentially, the inner tube 1, and the outer casing, or shoe 2, which latter includes the tread portion 3 and a pair of attaching portions 4 adapted to be mounted upon the wheel rim 5 of ordinary well known construction, so as to provide means for detachably securing the tread portion to the said rim.

The tread portion of the shoe is constructed of a wire mesh of tough, durable metal, which may be in the form of open links 6, as shown in the drawings, or it may be woven, if it proves desirable. This tread of mail is preferably embedded within rubber, or some such elastic material, as shown at 7. An annular wire 8 is embraced by the links at each side edge of the tread mesh, and each of the two wires thus provided has attached thereto at spaced intervals a plurality of attaching links 9, these links being preferably welded to the wires 8, or otherwise fixedly attached thereto so as to extend inwardly therefrom for reception within the spaced slots 10 in the outer edges of the annular attaching members 11. These attaching members 11 are adapted to be clamped upon the rim 5 in spaced relation to each other with their side flanges 12 in engagement with the securing flanges 13 of the rim, by means of the clamping bolt members 14 which are adjustably mounted within the apertured, laterally projecting lugs 15 provided upon the meeting ends of the said members. Each attaching member 11 is provided in its outer side face with a circumferentially extending groove 16 communicating with all of the radiating slots 10 therein. An annular locking element 17, shown particularly in Fig. 5, is mounted upon the outer side face of each attaching member 11 for limited circumferential movement, and is disposed inwardly with respect to the groove 16 in the said member. Each locking element is secured to the corresponding attaching member by means of the laterally extending bolt members 18 which extend outwardly from each attaching member through the limiting slots 19 in the locking element. These bolts are intended to serve as means for limiting the circumferential movement of the locking elements and further as means for detachably securing the said elements to the attaching members, the said bolt members being provided with threaded nuts 20. Each locking element is provided on its outer periphery with a plurality of locking fingers 21, each including a laterally projecting portion 22 extending into the groove 16 in the corresponding attaching member, and an active portion 23 extending parallel to the element body and movable within said groove for engagement within one of the attaching links 9, when the latter is received within an adjacent slot 10.

It will thus be seen that, after the tread portion of the shoe is placed in position with its attaching links 9 disposed within the proper slots 10 in the attaching members, this being accomplished readily by lateral movement alone of the said tread portion, the tread portion may be effectively secured to the attaching members by moving the locking elements until the active portions 23 of their locking fingers 21 engage within the said links 9. Then the nuts 20 may be tightened so as to prevent the locking elements from moving accidentally into inoperative position.

The inner tube when employed in a tire of this construction may be inflated after the tread portion of the shoe is secured in position. In order to prevent this inner tube from becoming dangerously worn as would occur upon contact of the same with the outer edges of the attaching members, which are non-yieldable, I have provided a protective lining 24 of tough fabric, leather, or like material, which may include a number of layers, as the occasion demands.

In constructing a tire of this character for use upon a heavy vehicle such as a motor truck, the metallic mesh may be constructed of heavy links, and an inner lining for use in connection with such a heavy tread should be constructed of a number of layers of leather. For lighter vehicles the tread mesh may be formed of lighter and more closely woven links, the protective lining therefor being constructed of canvas, or some such light, and yet durable fabric. It is to be understood that these expedients of construction are to be determined in view of the requirements of usage, and are not departures from the general scope of the invention.

In Fig. 6 I have shown the metallic mesh comprising the tread portion of the shoe exposed by the omission of the elastic material in which it is embedded in the preferred form of the invention. Such a modified construction might prove desirable when the tire is to be used upon slippery streets, especially in winter time, when they are covered with sleet or ice, as such a tread surface would obtain a more effective purchase upon such slippery surfaces over which the machine passes. This would prevent to a considerable degree the usual skidding when turning sharp corners, or other such occurrences, which are a common source of annoyance to drivers of motor vehicles.

In Fig. 7, I have disclosed a modified form of inner tube, which will be very inexpensive to manufacture and yet will afford the desired resiliency and cushioning effect, when employed in connection with a tire shoe of the construction described. This inner tube is constructed of a gelatinous substance, such as that of which printers' rolls are formed. In providing my improved tire shoe with an inner tube of this nature, the gelatinous material, which is initially of such a consistency that it will flow, is poured into the inner lining of the shoe which forms a mold for the same. After this material has become hardened, it will present a non-puncturable tube, which will be very efficient in operation and which will be very durable, owing to the fact that it is doubly protected by the protective lining and the tread portion of the shoe itself. Even after the protective lining has become worn, due to the slight frictional engagement between the same and the links constituting the shoe tread, the tread mesh itself will protect the inner tube to a considerable extent. When the metallic mesh of the shoe tread is embedded in the rubber, or similar elastic material, there will be very little wear between the shoe tread and the inner tube, and thus, it may prove desirable to dispense with the protective lining of the shoe, when using a solid inner tube of elastic composition as just described.

What I claim is:

1. In a tire of the class described, a tire shoe adapted to be mounted upon a rim and including a flexible tread portion of metallic mesh, annular members attached to the side edges of the mesh, a pair of annular attaching members adapted to be mounted upon the rim and having lateral flanges adapted for engagement with the rim flanges, each attaching member being disposed adjacent to and inwardly of one of the said annular members of the tire tread, a plurality of attaching links formed upon each annular member of the tread so as to project radially with respect thereto, a locking element mounted upon each attaching member for circumferential movement with respect thereto, and a plurality of fingers provided upon each locking element having circumferentially extending portions adapted for engagement within the attaching links of the adjacent annular member of the tread.

2. In a tire of the class described, a tire shoe adapted to be mounted upon a rim and including a flexible tread portion of metallic mesh, annular members attached to the side edges of the mesh, a pair of annular attaching members adapted to be mounted upon the rim and having lateral flanges adapted for engagement with the rim flanges, each attaching member being disposed adjacent to and inwardly of one of the said annular members of the tire tread, a plurality of attaching links formed upon each annular member of the tread so as to project radially with respect thereto, a locking element mounted upon each attaching member for circumferential movement with respect thereto, a plurality of fingers provided upon each locking element having circumferentially extending portions adapted for engagement within the attaching links of the adjacent annular member of the tread, and means for limiting the circumferential movement of the locking element upon the corresponding attaching member.

In testimony whereof I affix my signature in presence of two witnesses.

ELLIHU G. McDILL.

Witnesses:
F. B. GARDNER,
ROBT. J. MAXWELL.